US009215739B2

(12) United States Patent
Wang et al.

(10) Patent No.: US 9,215,739 B2
(45) Date of Patent: Dec. 15, 2015

(54) METHOD FOR PAIRING USERS OF WIRELESS MOBILE COMMUNICATION DEVICE AND SERVER THEREOF

(71) Applicants: Tien-Ming Wang, Taipei (TW); Yi-Chien Chen, Taipei (TW)

(72) Inventors: Tien-Ming Wang, Taipei (TW); Yi-Chien Chen, Taipei (TW)

( * ) Notice: Subject to any disclaimer, the term of this patent is extended or adjusted under 35 U.S.C. 154(b) by 98 days.

(21) Appl. No.: 14/217,522

(22) Filed: Mar. 18, 2014

(65) Prior Publication Data

US 2014/0287680 A1 Sep. 25, 2014

(30) Foreign Application Priority Data

Mar. 20, 2013 (TW) .............................. 102109926 A
Mar. 29, 2013 (TW) .............................. 102205912 U

(51) Int. Cl.
*H04B 7/00* (2006.01)
*H04W 76/02* (2009.01)
*H04W 64/00* (2009.01)

(52) U.S. Cl.
CPC ............ *H04W 76/021* (2013.01); *H04W 64/00* (2013.01)

(58) Field of Classification Search
CPC ........................... H04W 76/021; H04W 64/00

USPC ............ 455/41.1, 41.2, 566, 456.3, 457, 514, 455/73, 130, 306, 307
See application file for complete search history.

(56) References Cited

U.S. PATENT DOCUMENTS

| 2013/0002551 | A1* | 1/2013 | Imoto | ..................... G06F 3/013 345/158 |
| 2013/0073253 | A1* | 3/2013 | Handa | ..................... G01C 17/38 702/152 |
| 2013/0268246 | A1* | 10/2013 | Gordin | ..................... G06F 17/50 703/1 |

* cited by examiner

*Primary Examiner* — Tuan Pham
(74) *Attorney, Agent, or Firm* — Alan D. Kamrath; Kamrath IP Lawfirm, P.A.

(57) ABSTRACT

A method for pairing users of a wireless mobile communication device and a server thereof includes the following steps: (1) receiving the three-dimensional coordinates of a first wireless mobile communication device; (2) accessing a query database containing a piece of first relationship data and a plurality of pieces of second relationship data; (3) filtering at least one associated with the related attributes of the first relationship data from a plurality of pieces of second relationship data according to the related attributes of the first relationship data; (4) providing the three-dimensional coordinates of each said second wireless mobile communication device according to the filtered second relationship data; and (5) calculating the offset between the three-dimensional coordinates of the first wireless mobile communication device and the three-dimensional coordinates of each said second wireless mobile communication device.

6 Claims, 3 Drawing Sheets

METHOD FOR PAIRING USERS OF WIRELESS MOBILE COMMUNICATION DEVICE AND SERVER THEREOF

BACKGROUND OF THE INVENTION

1. Field of the Invention

The present invention is related to a smart phone application, and particularly to a method for calculating three-dimensional geographic information and a server thereof.

2. Description of the Related Art

With the advent of smart phones or tablets, more and more people have the habit of using a mobile phone or tablet to contact with relatives and friends. Therefore, a variety of chat programs or applications emerge.

In addition to the message/video function frequently used in the general chat programs, the relevant operators even provide many other additional features, such as finding good friends provided by Line™ or What'sApp™, with the use mobile positioning to return data to database and to calculate all mobile positioning data and provide users the information about good friends nearby in order to attract the increased use of smart phones.

However, the aforementioned calculation method may take up a lot of operational resources because the operators may need to calculate the searcher's location, have the location of all phone users back to the database, and then calculate which users are located near the searcher. Consequently, the operators must identify the pairing (anyone near the searcher) from all mobile phone users, and thus a lot of useless information will also be included in the calculation, resulting in ineffective waste of operational resources. In particular, the position of phone users continues to change. As a result, the positioning information is constantly updated, and the amount of calculation may become very large.

In addition, the current mobile phone positioning is a two-dimensional (2D) calculation and does not provide a three-dimensional (3D) calculation. Therefore, it can only provide the relative horizontal distance between two points and cannot calculate the height difference between two points. However, providing a height difference enables the user to more accurately know the distance between the user and the nearby friend.

SUMMARY OF THE INVENTION

It is a major objective of the present invention to provide a method that can reduce computational resources and quickly find the target, and to provide a server thereof.

It is another objective of the present invention to provide a server that can display height information.

A method for pairing users of the wireless mobile communication device provided by the present invention includes the following steps: (1) receiving the three-dimensional coordinates of a first wireless mobile communication device; (2) accessing a query database containing a piece of first relationship data and a plurality of pieces of second relationship data, wherein the first relationship data is the related user attributes of the first wireless mobile communication device, and each piece of the second relationship data is the other different user related attributes of the second wireless mobile communication device; (3) filtering at least one associated with the related attributes of the first relationship data from the plurality of second relationship data according to the related attributes of the first relationship data; (4) providing the related three-dimensional coordinates of each said second wireless mobile communication device according to the filtered second relationship data; and (5) calculating the offset between the three-dimensional coordinates of the first wireless mobile communication device and the provided three-dimensional coordinates of each second wireless mobile communication device.

Preferably, the method in the present invention further includes: (6) filtering/selecting the three-dimensional coordinates which the offset is less than a specific offset, and providing the filtered three-dimensional coordinates to the first wireless mobile communication device. In addition, the method further includes: (7) displaying all of the filtered three-dimensional coordinates on the first wireless mobile communication device.

Since the aforementioned method can be best completed by a computer program, the method in the present invention can use a computer program written in a medium available to the computer, such as hard drives, integrated circuits, optical discs and other computer programs recordable objects. The medium includes code to achieve the method described above. The object is preferably CD, CD-R, MO, floppy disks, hard disks, IC chips or any other item containing the record medium that can be used by those skilled in the art.

In addition, the present invention further provides a server for pairing users of the aforementioned wireless mobile communication device. The server includes: a receiving module, an access module, a first filter module, a coordinate module, and a calculation module. Preferably, the server further includes: a second filter module and an execution and display module, by which the above method can be achieved. The wireless mobile communication device displays all of the filtered three-dimensional coordinates. Each module can be the same or different memory medium with the entire computer program or segments of a computer program to achieve the method described above.

DETAILED DESCRIPTION OF THE PREFERRED EMBODIMENT

Figure 1:
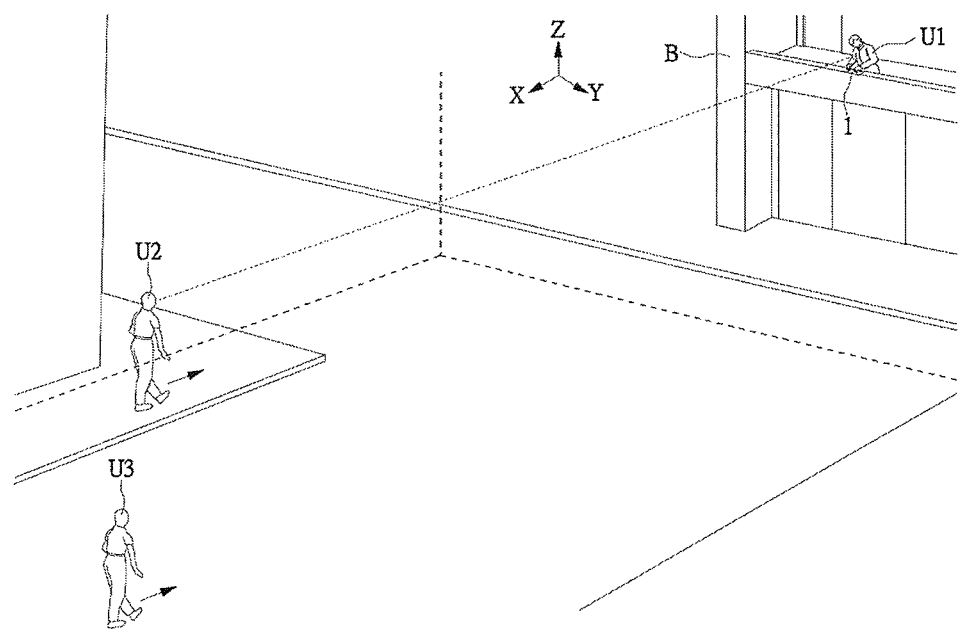
FIG. 1 shows that multiple users are using smart phones at the same time.

Please first refer to FIG. 1, which shows that multiple users U1, U2, and U3 are using wireless mobile communication devices. When a user U1 located in Building B wants to use a wireless mobile communication device 1 to find a nearby friend, the user can make use of the method in the present invention to achieve the purpose of quick search.

Figure 2:
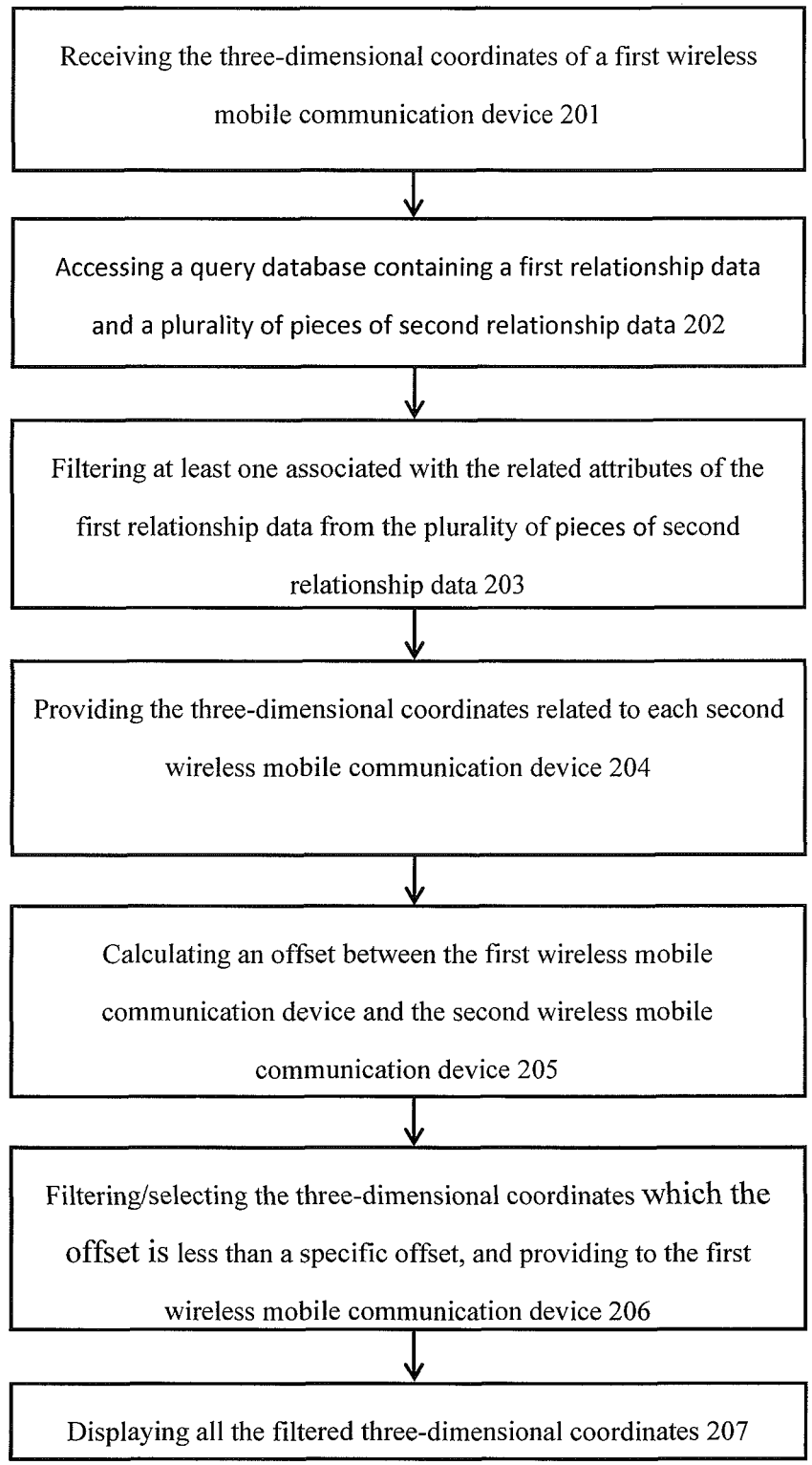
FIG. 2 is a flowchart showing a method for pairing users of a wireless mobile communication device according to the present invention.

Please refer to FIG. 2. The method for pairing users of the wireless mobile communication device provided by the present invention includes the following steps: in Step 201: Receiving the three-dimensional coordinates of a first wireless mobile communication device. For example, when the user U1 in FIG. 1 wants to find a nearby friend, the user's first wireless mobile communication device 1 will issue a request signal (e.g. starting a special program, including multi-touch to start the program and issue the request signal). Then, the method according to the present invention will identify the three-dimensional coordinates of the user U1, e.g. (1, 2, 1), according to the request signal.

Then, in Step 202: Accessing a query database containing a piece of first relationship data and a plurality of pieces of second relationship data, wherein the first relationship data and the second relationship data are the related user attributes of different wireless mobile communication devices respectively. For example, the related attributes include user gender, marital status, love orientation, scope of work, home range, frequently moving areas, etc. The related attributes may be the user attributes stored by mobile or related operators in a database for access.

After that, in Step 203: Filtering at least one associated with the related attributes of the first relationship data from the plurality of second relationship data according to the related attributes of the first relationship data. For example, if the user U1 in FIG. 1, a married male apparel sales manager whose work area is Taipei city, is searching for a married male garment manufacturing manager located nearby, the first wireless mobile communication device 1 in FIG. 1 will issue a request signal to identify the related attributes of the user U1 according to the query database it requests to access, e.g. a married male apparel sales manager whose work area is Taipei city. Then, the relationship data associated with the related attributes of the user U1 (at least one piece of the second relationship data) will be filtered from the query database, e.g. the user U2 who is a married male apparel sales manager and works in Taipei city, while the user U3, a unmarried software engineer, is not filtered. As a result, the target that may need to be calculated is first filtered and identified, which can reduce the resources to check the dynamic position of the target and achieve the purpose of reducing computational resources and quick search.

Then, in Step 204: Providing the three-dimensional coordinates of each related second wireless mobile communication device according to the filtered second relationship data. For example, in FIG. 1, the user U2 is a married male apparel sales manager whose work area is Taipei city, and the user U3 is an unmarried male software engineer. Accordingly, the method according to the present invention only regards the user U2 as a target and provide the user U2 the three-dimensional coordinates, e.g. (0, −1, 0) of the wireless mobile communication device (second wireless mobile communication device).

Finally, in Step 205: Calculating the offset between the three-dimensional coordinates of the first wireless mobile communication device and the three-dimensional coordinates of each second wireless mobile communication device, e.g. calculating the offset between the wireless mobile communication device of the user U1 and that of the user U2. That is, the substantial offset between (1, 2, 1) and (0, −1, 0), including horizontal distance and height difference, can be calculated. Therefore, the use of the method according to the present invention can not only accelerate the computation but also provide height information.

Preferably, the method according to the present invention further includes Step 206: Filtering/selecting the three-dimensional coordinates which the offset is less than a specific offset, and providing the filtered three-dimensional coordinates to the first wireless mobile communication device. As the offset represents the distance between two users, the targets can be further filtered out if the distances of which is too far away, it can be further filtered out, i.e. be closer to the target the user U1 wants to find.

In addition, the method in the present invention further includes Step 207: Displaying the filtered three-dimensional coordinates on the first wireless mobile communication device, e.g. displaying the three-dimensional coordinates (0, −1, 0) of the user U2 on the wireless mobile communication device 1 of the user U1.

The method described above is not intended to limit the flow of the present invention, and it is for illustrative purpose only. For example, the method according to the present invention may also first calculate the distance and then process the filtering of the related attributes. Therefore, the method in the present invention is not to limit the flow sequence.

Since the aforementioned method can be best completed by a computer program, the method in the present invention may utilize a computer program written in a medium available to the computer, such as hard drives, integrated circuits, optical discs and other computer programs recordable objects. The medium includes code to achieve the method described above. The objects are preferably CDs, CD-R, MO, floppy disks, hard disks, IC chips or any other item containing the record medium that can be used by those skilled in the art.

Figure 3:
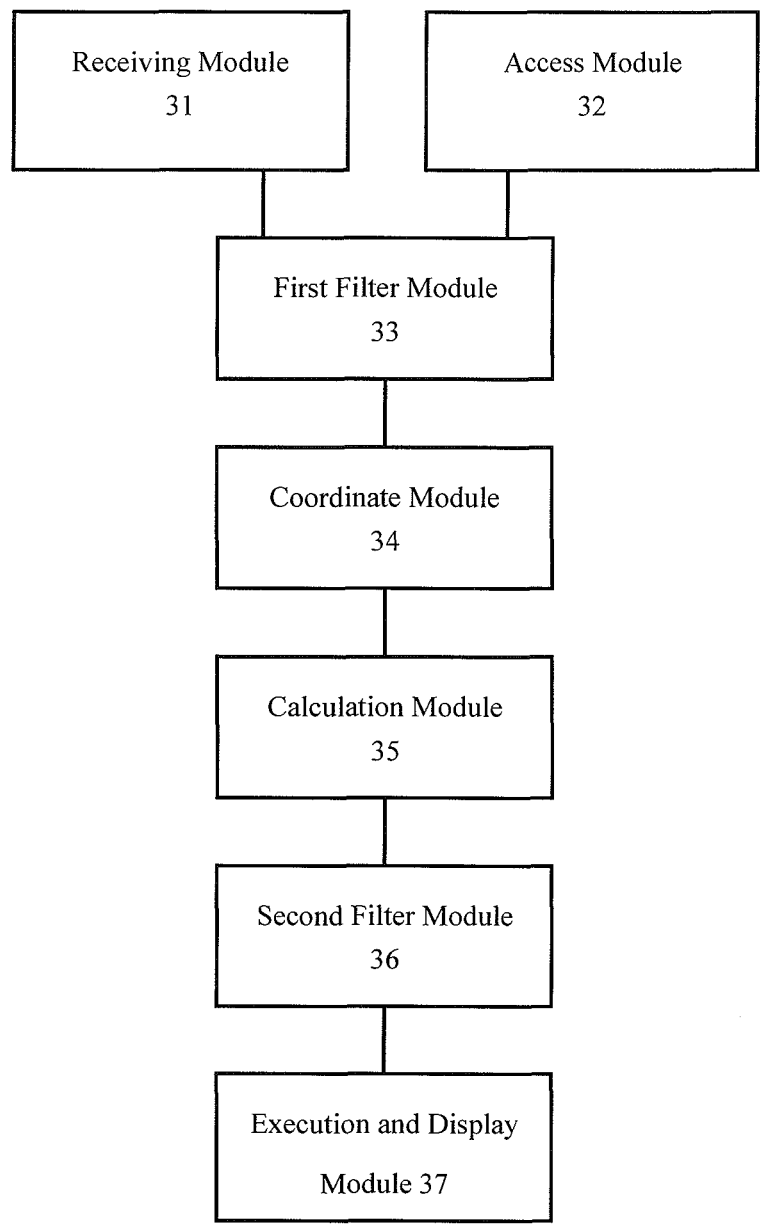
FIG. 3 is a block diagram of a server according to the present invention.

In addition, please refer to the architecture of the server in FIG. 3, which is used for calculating the aforementioned three-dimensional geographic information. The server includes: a receiving module 31, an access module 32, a first filter module 33, a coordinate module 34, and a calculation module 35; preferably, the server further includes: a second filter module 36 and an execution and display module 37, by which the method described above can be achieved. Each module may be the same or different memory medium with computer programs or segments of the entire computer program used to achieve the method described above.

Although the present invention has been described with reference to preferred embodiments, it should be noted that the described embodiments are not necessarily exclusive, and that various changes and modifications may be made to the described embodiments without departing from the scope of the invention as disposed by the appended claims.

What is claimed is:

1. A method for pairing users of a wireless mobile communication device, comprising the steps of:
   receiving the three-dimensional coordinates of a first wireless mobile communication device;
   accessing a query database containing a piece of first relationship data and a plurality of pieces of second relationship data, wherein the first relationship data is the related user attributes of the first wireless mobile communication device, and each piece of the second relationship data is the other different user related attributes of a second wireless mobile communication device;
   filtering at least one associated with the related attributes of the first relationship data from the plurality of second relationship data according to the related attributes of the first relationship data;
   providing the three-dimensional coordinates related to each second wireless mobile communication device according to the filtered second relationship data; and
   calculating an offset between the three-dimensional coordinates of the first wireless mobile communication device and the three-dimensional coordinates of each said second wireless mobile communication device.

2. The method as claimed in claim 1, further comprising:
   filtering/selecting the three-dimensional coordinates which the offset is less than a specific offset, and providing the filtered three-dimensional coordinates to the first wireless mobile communication device.

3. The method as claimed in claim 2, further comprising:
   displaying the filtered three-dimensional coordinates on the first wireless mobile communication device.

4. A server for pairing users of the wireless mobile communication device, the server comprising:
- a receiving module, which is used for receiving the three-dimensional coordinates of a first wireless mobile communication device;
- an access module, which is used for accessing a query database that stores a piece of first relationship data and a plurality of pieces of second relationship data, wherein the first relationship data is the related user attributes of the first wireless mobile communication device, and each piece of the second relationship data is the other different user related attributes of the second wireless mobile communication device; the access module being able to receive a plurality of pieces of second relationship data, wherein each piece of the second relationship data is the other different user related attributes of each said second wireless mobile communication device;
- a first filter module, which is electrically connected to the receiving module and the access module respectively, and is used for filtering at least one associated with the related attributes of the first relationship data from the plurality of second relationship data according to the related attributes of the first relationship data;
- a coordinate module, which is electrically connected to the first filter module for providing the related three-dimensional coordinates of each said second wireless mobile communication device according to the filtered second relationship data; and
- a calculation module, which is electrically connected to the coordinate module, and is used for calculating the offset between the three-dimensional coordinates of the first wireless mobile communication device and the three-dimensional coordinates of each said second wireless mobile communication device.

5. The server as claimed in claim 4, further comprising a second filter module electrically connected to the calculation module, wherein:
- the second filter module filters/selects the three-dimensional coordinates which the offset is less than a specific offset, and provides the filtered three-dimensional coordinates to the first wireless mobile communication device.

6. The server as claimed in claim 5, further comprising an execution and display module electrically connected to the second filter module, wherein:
- the execution and display module enables the first wireless mobile communication device to display all of the filtered three-dimensional coordinates.

* * * * *